(12) United States Patent
    Chen

(10) Patent No.: US 12,120,379 B2
(45) Date of Patent: Oct. 15, 2024

(54) COMMENT INFORMATION DISPLAY

(71) Applicant: Tencent Technology (Shenzhen) Company Limited, Guangdong (CN)

(72) Inventor: Xiaodan Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/196,868

(22) Filed: May 12, 2023

(65) Prior Publication Data
     US 2023/0291959 A1    Sep. 14, 2023

Related U.S. Application Data

(63) Continuation of application No. PCT/CN2022/111612, filed on Aug. 11, 2022.

(30) Foreign Application Priority Data

Aug. 31, 2021   (CN) .......................... 202111016208.9

(51) Int. Cl.
    *H04N 21/431*  (2011.01)
    *H04N 21/435*  (2011.01)
    *H04N 21/485*  (2011.01)
(52) U.S. Cl.
    CPC ....... *H04N 21/4316* (2013.01); *H04N 21/435* (2013.01); *H04N 21/4858* (2013.01)

(58) Field of Classification Search
    CPC ............ H04N 21/4316; H04N 21/435; H04N 21/4858; H04N 21/47217; H04N 21/4788; H04N 21/431; H04N 21/4756; H04N 21/4882
    See application file for complete search history.

(56) References Cited

U.S. PATENT DOCUMENTS

2009/0013048 A1*  1/2009  Partaker ................. H04L 67/54
                                                             709/206
    2020/0336718 A1* 10/2020  Yoon ...................... G06F 40/169
    2020/0412976 A1* 12/2020  Hao ........................ H04N 23/60
    2023/0024382 A1*  1/2023  Wang ...................... G06V 10/74

* cited by examiner

*Primary Examiner* — Adil Ocak
    (74) *Attorney, Agent, or Firm* — ArentFox Schiff LLP

(57) ABSTRACT

A comment information display method is provided. In the method, a video and a comment interface are displayed. A video clip matching result of a comment content that is input via the comment interface is obtained. Target comment information including a video clip playback control element in the comment interface is displayed based on the video clip matching result including a target video clip that matches the comment content. The target video clip is played back based on a user selection of the video clip playback control element in the comment interface.

17 Claims, 7 Drawing Sheets

COMMENT INFORMATION DISPLAY

RELATED APPLICATIONS

The present application is a continuation of International Application No. PCT/CN2022/111612, entitled "COMMENT INFORMATION DISPLAY METHOD AND APPARATUS, DEVICE, STORAGE MEDIUM, AND PROGRAM PRODUCT" and filed on Aug. 11, 2022, which claims priority to Chinese Patent Application No. 202111016208.9, entitled "COMMENT INFORMATION DISPLAY METHOD AND APPARATUS, COMPUTER DEVICE, AND STORAGE MEDIUM" and filed on Aug. 31, 2021. The entire disclosures of the prior applications are incorporated by reference.

FIELD OF THE TECHNOLOGY

Embodiments of this application relate to the field of multimedia technologies, including to comment information display.

BACKGROUND OF THE DISCLOSURE

With the development of multimedia technology, more and more applications and webpages support video playback, and can display comment information posted by users, or other interactive objects in a video playback interface, so as to bring a real-time interactive experience to the users.

In the related art, the comment information displayed in the video playback interface is information that includes at least one of a text or an image. The dimensions of the information provided by the comment information are relatively limited, and the interactive experience of the users can be poor, resulting in a low human-computer interaction rate.

SUMMARY

In view of the above, embodiments of this disclosure provide a comment information display method and apparatus, a device, a storage medium, and a program product, which can be used for expanding a dimension of the information provided by comment information and improving the human-computer interaction rate. The technical solutions are as follows:

According to an aspect, the embodiments of this disclosure provide a comment information display method. In the method, a video and a comment interface are displayed. A video clip matching result of a comment content that is input via the comment interface is obtained. Target comment information including a video clip playback control element in the comment interface is displayed based on the video clip matching result including a target video clip that matches the comment content. The target video clip is played back based on a user selection of the video clip playback control element in the comment interface.

According to another aspect, provided is a comment information display apparatus, including processing circuitry. The processing circuitry is configured to display a video and a comment interface. The processing circuitry is configured to obtain a video clip matching result of a comment content that is input via the comment interface. The processing circuitry is configured to display target comment information including a video clip playback control element in the comment interface based on the video clip matching result including a target video clip that matches the comment content. The processing circuitry is configured to play back the target video clip based on a user selection of the video clip playback control element in the comment interface.

According to another aspect, provided is a computer device, including a processor and a memory, the memory having at least one computer program stored, and the at least one computer program being loaded and executed by the processor to cause the computer device to implement the comment information display method.

According to another aspect, also provided is a non-transitory computer-readable storage medium, storing instructions which when executed by a processor cause the processor to implement the comment information display method.

According to another aspect, also provided is a computer program product, including a computer program or a computer instruction, the computer program or the computer instruction being loaded and executed by a processor to cause a computer to implement the comment information display method.

Technical solutions provided in the embodiments of this disclosure can include the following beneficial effects:

According to the technical solutions provided in the embodiments of this disclosure, comment information including a video clip playback control can be displayed on the video playback interface. The video clip playback control can trigger playback of a target video clip matching the comment content. That is to say, the comment information displayed in the embodiments of this disclosure can provide information of a dimension of a video clip, and expands a dimension of the information provided by the comment information. The user can trigger the video clip playback control in the comment information to watch the target video clip, which increases the diversity of the comment manner, and improves the interactive experience of the user, thereby improving the human-computer interaction rate.

DESCRIPTION OF EMBODIMENTS

To make the objectives, technical solutions, and advantages of this disclosure clearer, the following describes exemplary implementations of this disclosure with reference to the accompanying drawings.

In this disclosure, the terms "first", "second", and so on are intended to distinguish between similar or different objects rather than describe a specific order. It is to be understood that such used data is interchangeable where appropriate so that the embodiments of this disclosure described here can be implemented in an order other than those illustrated or described here. The implementations described in the following exemplary embodiments do not represent all implementations consistent with this disclosure.

Figure 1:
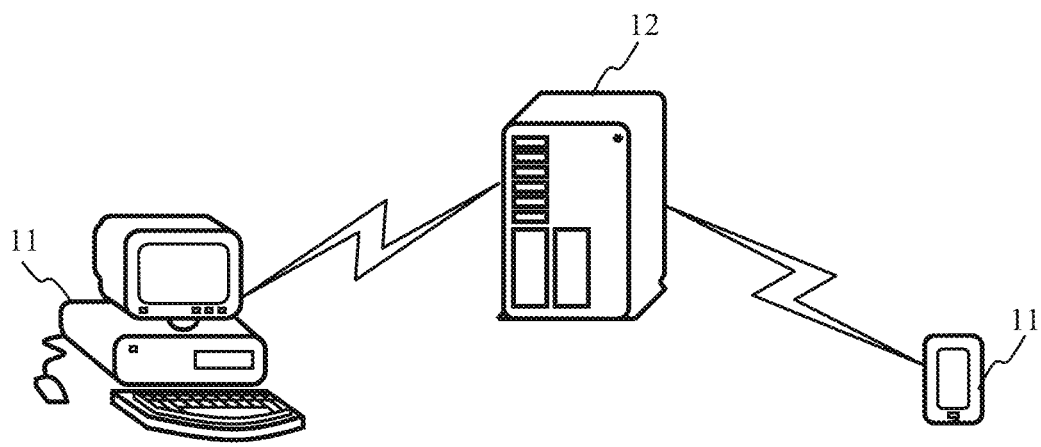
FIG. 1 is a schematic diagram of an implementation environment of a comment information display method according to some embodiments of this disclosure.

FIG. 1 is a schematic diagram of an implementation environment of a comment information display method according to some embodiments of this disclosure. The implementation environment includes a terminal 11 and a server 12.

An application or a webpage that supports video playback and comment information display is installed and runs on the terminal 11. When the comment information is to be displayed on the video playback interface, the application or the webpage can display the comment information on the video playback interface by applying any of the methods provided in the embodiments of this disclosure. For example, the application or the webpage is a video application or webpage, a live broadcast application or webpage, a browser application or webpage, etc. For example, the terminal 11 is a device used by any interactive object, such as a user, and has an account number of the interactive object logged on.

The server 12 is a background server of an application or a webpage that supports video playback and comment information display and is installed by the terminal, and is configured to provide a background service for the application or the webpage.

The terminal 11 may be any electronic product that can perform human-computer interaction with a user in one or more ways such as a keyboard, a touchpad, a touch screen, a remote control, voice interaction, or a handwriting device, e.g. a personal computer (PC), a mobile phone, a smartphone, a personal digital assistant (PDA), a wearable device, a pocket PC (PPC), a tablet computer, an intelligent vehicle-mounted machine, a smart TV, a smart speaker, or a vehicle-mounted terminal, etc. The server 12 may be one server, a server cluster including a plurality of servers, or a cloud computing service center. A communication connection is established between the terminal 11 and the server 12 through a wired or wireless network.

It is noted that the terminal 11 and the server 12 are merely examples, and other terminals or servers that may be applicable to this disclosure are within the scope of this disclosure.

Figure 2:
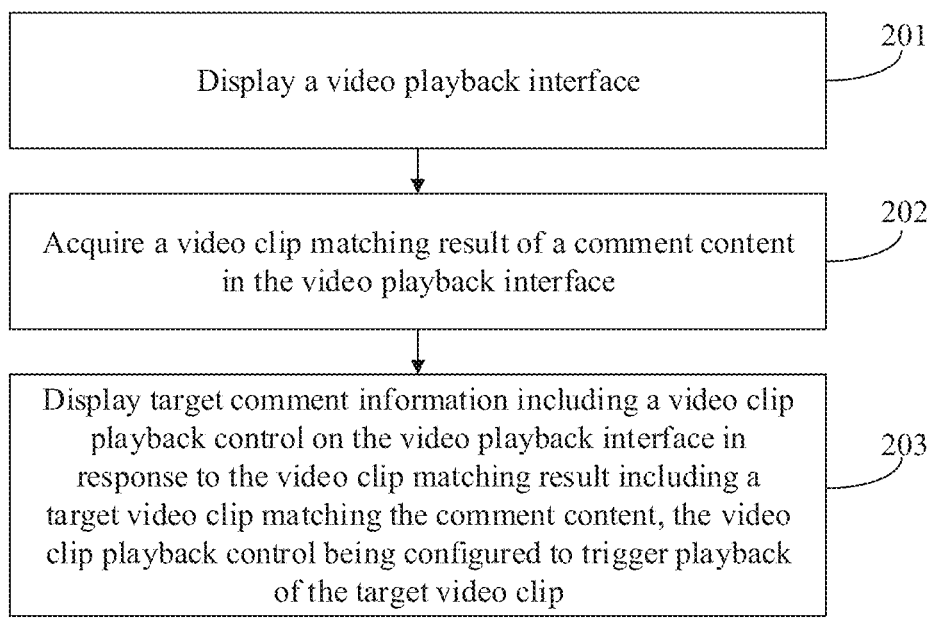
FIG. 2 is a flowchart for a comment information display method according to some embodiments of this disclosure.

Based on the foregoing implementation environment shown in FIG. 1, embodiments of this disclosure provide a comment information display method. The method is implemented by the terminal 11, which is taken as an example. As shown in FIG. 2, the comment information display method provided in the embodiments of this disclosure may include step 201 to step 203.

In step 201, a video playback interface is displayed.

The video playback interface is an interface where a video that a user is currently watching is played. The video that the user is currently watching may be referred to as a first video. That is to say, the first video is played on the video playback interface. The playback manner of the first video on the video playback interface is not limited in the embodiments of this disclosure. For example, a full screen playback manner (e.g. landscape playback) or a window playback manner (e.g. portrait playback), etc. is used for the first video, which is relevant to a playback setting of the application or the webpage in the video playback interface.

In some embodiments, the video playback interface is an interface in an application that supports video playback and comment information display, or the video playback interface is an interface in a webpage that supports video playback and comment information display, which is not limited in the embodiments of this disclosure. For example, the first video is a recorded video or a live broadcast video, which is not limited in the embodiments of this disclosure.

In an implementation, the manner of displaying the video playback interface by the terminal includes: in response to a playback instruction of the first video, the terminal acquires the first video, displays the video playback interface, and plays the first video on the video playback interface. In an example, the terminal also acquires historical comment information corresponding to the first video. The historical comment information is a comment made by at least one user when watching the first video. The form of the historical comment information is not limited in this disclosure, and may be a comment displayed in a video comment section or a moving comment, e.g. Danmu comment, displayed in a region where the first video is played.

Taking a Danmu comment as an example, the historical comment information corresponding to the current playback progress can be displayed on the video playback interface based on the playback progress of the first video. In some embodiments, the historical comment information corresponding to the first video is not displayed when the first video is played in the terminal.

In exemplary embodiments, the first video is a video stored on the server. The terminal acquires the first video and the historical comment information corresponding to the first video by interacting with the server. In exemplary embodiments, the first video is a video locally stored by the terminal. The terminal locally extracts the first video, and acquires the historical comment information corresponding to the first video by interacting with the server.

In an implementation, at least one of a content editing box, a video clip matching control, or a comment information posting control is displayed on the video playback interface. The content editing box is used for displaying a comment content. In exemplary embodiments, the content editing box provides a voice input interface. The user can input a comment voice by triggering the voice input interface provided by the content editing box. The terminal then displays, in the content editing box, the comment content obtained by performing speech recognition on the comment voice. In exemplary embodiments, the user can directly edit the comment content in the forms of text, images, etc. in the content editing box. The video clip matching control is configured to trigger to acquire a video clip matching result. The comment information posting control is configured to trigger to post the comment information.

The display positions and forms of the content editing box, the video clip matching control, and the comment information posting control can be set according to experience or flexibly adjusted according to application scenes, which is not limited in the embodiments of this disclosure. For example, the content editing box, the video clip matching control, and the comment information posting control can all be displayed in a lower right region of the video playback interface. The content editing box is an editable input box. The video clip matching control is a triggerable icon or a triggerable button, etc. The comment information posting control is a triggerable icon or a triggerable button, etc.

For example, first information is displayed on the video clip matching control, and is used to notify or prompt the user that the control is configured to trigger to acquire the video clip matching result. Second information is displayed on the comment information posting control, and is used to notify or prompt that the control is configured to trigger to post the comment information. The first information and the second information can be set according to experience or flexibly adjusted according to application scenes, which is not limited in the embodiments of this disclosure.

Figure 3:
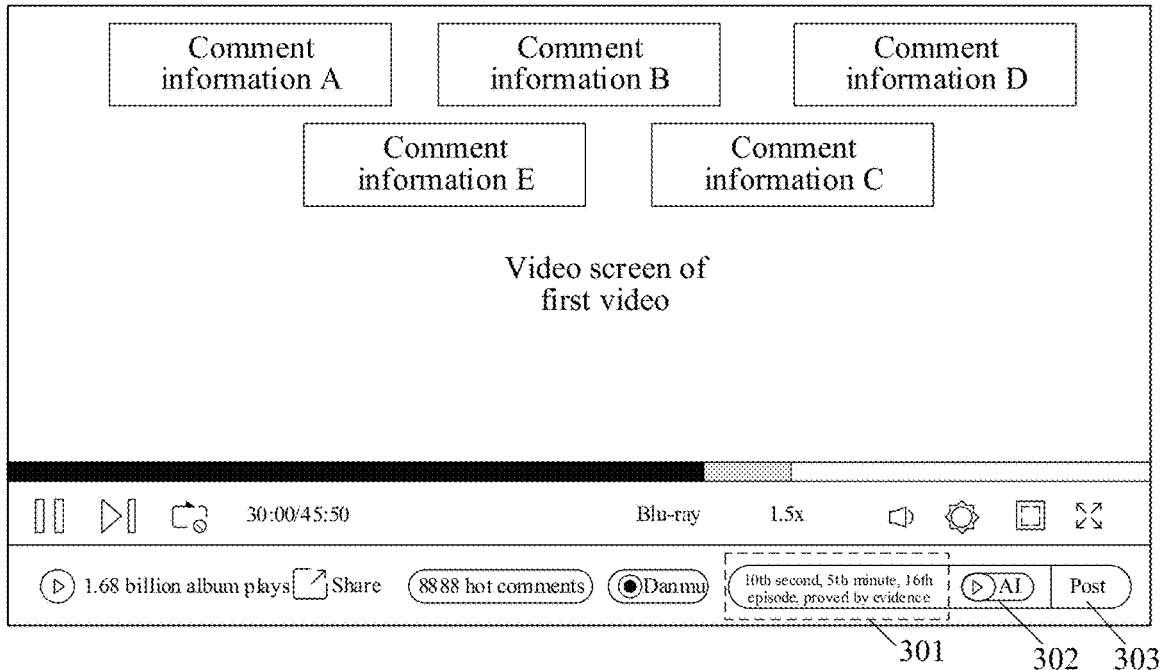
FIG. 3 is a schematic diagram of a video playback interface according to some embodiments of this disclosure.

For example, the video playback interface is as shown in FIG. 3. A content editing box 301, a video clip matching control 302, and a comment information posting control 303 are displayed in the video playback interface shown in FIG. 3. First information displayed on the video clip matching control 302 is "AI". Second information displayed on the comment information posting control 303 is "post". For example, a video screen of a first video and a plurality of pieces of historical comment information (comment information A, comment information B, comment information C, comment information D, and comment information E) corresponding to the first video are further displayed in the video playback interface shown in FIG. 3.

The plurality of pieces of historical comment information is displayed on the video screen of the first video in a floating manner. For example, the historical comment information is Danmu information, which is taken as an example. The plurality of pieces of historical comment information may refer to comment information matching a time point corresponding to a current video screen of the first video, or comment information posted by a user who is currently watching the first video, or comment information posted by other users when watching the first video, which is not limited in the embodiments of this disclosure. The plurality of pieces of historical comment information can move on the video playback interface as the user watches the first video. For example, a portrait of a user who posts the historical comment information can be displayed on the plurality of pieces of historical comment information. One user can obtain, through the portrait displayed on the historical comment information, the user who posts the comment information. The user can trigger the historical comment information to interact with a poster of the historical comment information.

For example, a playback progress bar, a playback control, playback duration information, a playback resolution, a playback rate, historical playback counting information, a sharing control, a comment information on/off control of the first video, etc. can also be displayed in the video playback interface shown in FIG. 3. The playback control of the first video includes, but is not limited to, a pause/play control, a next episode control, a loop playback control, a volume control, a setting control, a playback screen ratio selection control, a full screen playback control, etc. The comment information on/off control is selected by the user to enable or disable a comment information display function. As shown in FIG. 3, a character "Danmu" is displayed on the comment information on/off control.

For example, the comment information may be implemented using Danmu. Danmu is an example of a commentary subtitle that can be superimposed on a video screen. When watching a video, the user can express the viewing experience by posting Danmu, and can also view Danmu posted by other users at a current video playback time point. Users can communicate and interact with each other through Danmu.

In step 202, a video clip matching result of a comment content in the video playback interface is acquired.

The comment content in the video playback interface is a comment content provided by the user who is currently watching the first video (which may be referred to as a target user). For example, the comment content in the video playback interface refers to a comment content obtained by performing speech recognition on a comment voice inputted by the target user through voice. For example, the comment content in the video playback interface refers to a content displayed in the content editing box on the video playback interface. In exemplary embodiments, the content displayed in the content editing box refers to a content in the form of text, images, etc. that is directly edited by the target user in the content editing box, or refers to a content obtained by performing speech recognition by the terminal on a target comment voice. The target comment voice may be a comment voice inputted by the target user by triggering the voice input interface provided by the content editing box.

In the process of watching the first video, if the target user wants to make a comment on a video content of the first video at a certain time point, the target user can input a comment voice through voice or edit a comment content in the content editing box. For example, the content that the target user can edit in the content editing box includes, but is not limited to, text, images, etc. The text refers to a character inputted or uploaded by the target user. The image is selected by the target user from candidate images (such as emoticon images and cartoon images) provided by the application or the webpage where the first video is played, or locally selected and uploaded by the target user from the terminal, etc. For example, as shown in FIG. 3, the target user can directly spoil the clip that has been proved by evidence in the key part of the emotional entanglement between the male and female protagonists at the tense stage of the pilot. Therefore, the comment content edited by the target user in the content editing box is the text "10th second, 5th minute, 16th episode, proved by evidence".

After the comment content in the video playback interface is acquired, the video clip matching result of the comment content in the video playback interface is further acquired. In an implementation, after the comment content in the video playback interface is acquired, the operation of acquiring a video clip matching result of a comment content in the video playback interface is directly executed. In another implementation, the video clip matching control is displayed on the video playback interface. After the comment content in the video playback interface is acquired, in response to a trigger operation for the video clip matching control, the operation of acquiring a video clip matching result of a comment content in the video playback interface is executed.

The video clip matching control is configured to trigger to acquire the video clip matching result. The trigger operation for the video clip matching control can refer to a human-computer interaction operation triggered on the video clip matching control. The type of the trigger operation for the video clip matching control is not limited in the embodiments of this disclosure. For example, the trigger operation for the video clip matching control includes, but is not limited to, at least one of a single-click operation, a double-click operation, a floating touch operation, a pressure touch operation, or a sliding operation.

Figure 4:
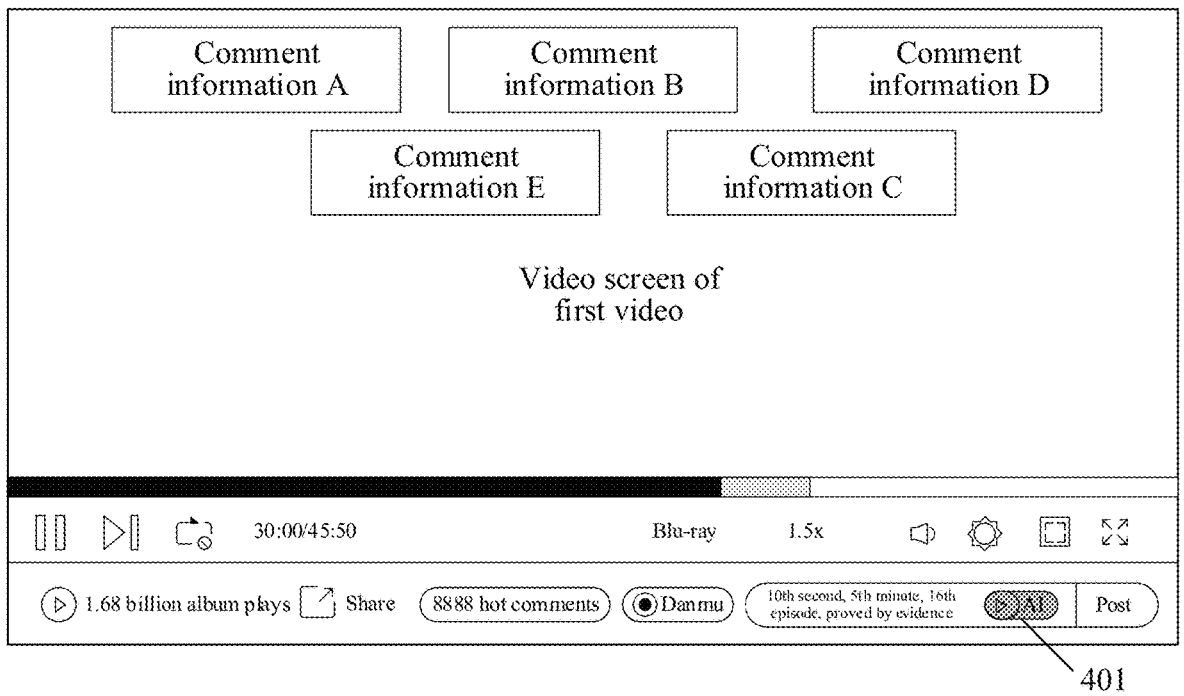
FIG. 4 is a schematic diagram of a video playback interface according to some embodiments of this disclosure.

In an implementation, after the trigger operation for the video clip matching control is acquired, a state of the video clip matching control is changed from a disabled state to an enabled state so as to use the enabled state to inform the target user that the video clip matching control has been successfully triggered. That is to say, in response to the trigger operation for the video clip matching control, the state of the video clip matching control is changed from the disabled state to the enabled state. The disabled state and the enabled state are two different control display states, and are not limited in the embodiments of this disclosure. For example, a video clip matching control in a disabled state is shown by 302 in FIG. 3, and a video clip matching control in an enabled state is shown by 401 in FIG. 4.

The video clip matching result of the comment content is used for indicating whether the comment content successfully matches a video clip. The video clip that the comment content successfully matches may be referred to as a target video clip in the embodiments of this disclosure. The target video clip refers to a video clip that matches the comment content and can present the meaning of the comment content in the form of a video. A duration of the target video clip can be set according to experience or flexibly adjusted according to an application scene, and is not limited in the embodiments of this disclosure. For example, the duration of the target video clip is 60 seconds.

In exemplary embodiments, two possible video clip matching results of the comment content are included. One is that the video clip matching result includes the target video clip, and the other is that the video clip matching result does not include the target video clip. If the video clip matching result of the comment content includes the target video clip, it indicates that the comment content successfully matches the video clip. If the video clip matching result of the comment content does not include the target video clip, it indicates that the comment content fails to match the video clip.

In exemplary embodiments, the video clip matching result which does not include the target video clip includes notification or prompt information, the notification or prompt information being used for notifying or prompting that the comment content fails to match the video clip. The form of the notification or prompt information is not limited in the embodiments of this disclosure. For example, the notification or prompt information includes only information indicating a matching result of matching failure, or includes information indicating a matching result of matching failure and information indicating a matching result of the cause of matching failure. For example, the cause of matching failure includes, but is not limited to, incorrect description of the comment content, absence of the video clip indicated by the comment content due to deletion, network failure, etc.

In an implementation, the manner that the terminal acquires the video clip matching result of the comment content in the video playback interface may indicate that the terminal locally acquires the video clip matching result of the comment content in the video playback interface, or the terminal acquires the video clip matching result of the comment content in the video playback interface by interacting with the server, which is not limited in the embodiments of this disclosure.

In an implementation, the process of locally acquiring the video clip matching result by the terminal includes step A and step B below.

In step A, text information corresponding to the comment content is recognized.

After acquiring the comment content in the video playback interface, the terminal recognizes the text information corresponding to the comment content, the comment content representing the meaning of the comment content to a certain extent.

For example, in a case that the comment content includes only a text content, the process of recognizing text information corresponding to the comment content is a semantic recognition process. Semantic recognition is a natural language processing technology that enables computers to comprehend, analyze, and automatically process the text content. Semantic recognition can comprehend the meaning of the text content. For example, in a case that the comment content includes only an image, the process of recognizing text information corresponding to the comment content is an image recognition process. Image recognition can identify the relevant information of the image. For example, if an image is an actor's face image, the image recognition can identify which actor's face the face in the image is. For example, in a case that the comment content includes both the text content and the image, the process of recognizing text information corresponding to the comment content is a comprehensive process of semantic recognition and image recognition. The manners of semantic recognition and image recognition are not limited in the embodiments of this disclosure. For example, a neural network model is used to realize semantic recognition and image recognition.

In step B, the text information is compared with tag information of a candidate video clip, and the video clip matching result of the comment content is acquired based on a comparison result. The candidate video clip is a video clip associated with the first video.

After the text information corresponding to the comment content is obtained by recognition, the text information is compared with the tag information of the candidate video clip, and the video clip matching result of the comment content is acquired based on the comparison result. The candidate video clip is a video clip associated with the first video. For example, the candidate video clip is a clip captured from at least one of the first video and an extended video corresponding thereto. The extended video corresponding to the first video is a video associated with the first video and used for extending a video content of the first video. For example, the extended video corresponding to the first video includes, but is not limited to, a behind-the-scenes video corresponding to the first video, a payment video corresponding to the first video, etc.

The manner of capturing the candidate video clip is not limited in the embodiments of this disclosure. For example, a frame video is captured as a candidate video clip, or a video clip with a reference duration is captured as a candidate video clip. The reference duration can be set according to experience or flexibly adjusted according to an application scene. For example, the reference duration is 10 seconds. For example, the manner of capturing the candidate video clip can be set according to experience or flexibly adjusted according to an actual video content to determine which video clip is captured as the candidate video clip from the first video and the extended video corresponding thereto, which is not limited in the embodiments of this disclosure.

The tag information of the candidate video clip is used for describing a content of the candidate video clip, and includes one or more tags. Different tags are used for describing different contents of the candidate video clip. For example, the tag information of the candidate video clip is used for describing one or more of pilot detail attributes, episodes, titles, time points, people, things, objects, scenes, events, and development stages of the candidate video clip. For example, a plurality of candidate video clips are included. Each candidate video clip has tag information. Tag information of different candidate video clips is possibly the same or different, which is not limited in the embodiments of this disclosure.

For example, before comparing the text information with the tag information of the candidate video clip, the terminal needs to acquire the tag information of the candidate video clip. For example, if the candidate video clip is locally stored in the terminal, the terminal locally acquires the tag information of the candidate video clip.

For example, the server interprets and transcodes the candidate video clip associated with the first video in advance to extract the tag information and store the same in, for example, a cloud storage space. That is to say, if the candidate video clip is stored in the server, the terminal acquires the tag information of the candidate video clip by interacting with the server. For example, the terminal transmits, to the server, a request carrying a video identifier of the first video, the request being used for acquiring the tag information of the candidate video clip corresponding to the first video. Upon receipt of the request transmitted by the terminal, the server extracts the tag information of the candidate video clip according to the video identifier of the first video, and then returns the tag information of the candidate video clip to the terminal.

After being acquired, the text information and the tag information of the candidate video clip are compared with each other. In an implementation, the manner of comparing the text information with tag information of a candidate video clip includes: acquiring a similarity between the text information and the tag information of the candidate video clip, and determining, according to the similarity, whether the text information successfully matches the tag information of the candidate video clip. The manner of acquiring a similarity between the text information and the tag information of the candidate video clip is not limited in the embodiments of this disclosure. For example, a ratio of the number of tags in tag information of a certain candidate video clip in the text information to the total number of tags in the tag information of the candidate video clip is taken as a similarity between the text information and the tag information of the candidate video clip.

For example, a feature extraction model is called to respectively perform feature extraction on the text information and the tag information of the candidate video clip to obtain the feature of the text information and the feature of the tag information of the candidate video clip. A similarity between the feature of the text information and the feature of the tag information of the candidate video clip is taken as a similarity between the text information and the tag information of the candidate video clip. For example, if both the feature of the text information and the feature of the tag information of the candidate video clip are vectors, the similarity between the feature of the text information and the feature of the tag information of the candidate video clip is obtained by calculating a similarity between the two vectors. For example, the similarity between the two vectors refers to cosine similarity, Jaccard similarity, etc. between the two vectors.

The text information is compared with the tag information of the candidate video clip to obtain a comparison result. Two possible comparison results are included. One is that the comparison result indicates that text information successfully matches tag information of a first candidate video clip. The other one is that the comparison result indicates that text information fails to match tag information of each candidate video clip. The manner of determining whether text information successfully matches tag information of a certain candidate video clip is not limited in the embodiments of this disclosure. For example, if a similarity between the text information and the tag information of a certain candidate video clip is not less than a similarity threshold, it is determined that the text information successfully matches the tag information of the candidate video clip. If the similarity between the text information and the tag information of a certain candidate video clip is less than the similarity threshold, it is determined that the text information fails to match the tag information of the candidate video clip. The similarity threshold can be set according to experience or flexibly adjusted according to an actual application scene, which is not limited in the embodiments of this disclosure.

If text information successfully matches tag information of one or more candidate video clips, the one or more candidate video clips being called as a first candidate video clip, a comparison result used for indicating that the text information successfully matches tag information of the first candidate video clip is obtained. If text information fails to match tag information of each candidate video clip, a comparison result used for indicating that the text information fails to match tag information of each candidate video clip is obtained.

The form of the comparison result is not limited in the embodiments of this disclosure. For example, the comparison result used for indicating that the text information successfully matches tag information of the first candidate video clip is a result including an identifier of the first candidate video clip. The comparison result used for indicating that the text information fails to match tag information of each candidate video clip is a result including empty information, or is a result including notification or prompt information of matching failure.

The tag information of the candidate video clip can accurately identify the relevant information of the candidate video clip, and the text information can identify the topic involved in the comment content. Therefore, the candidate video clip and the comment content obtained by matching the text information and the tag information are more closely relevant to each other, so that the matching accuracy is improved.

Moreover, when a matching step is executed by a server with stronger processing capability in some scenes (such as in a stabler communication network), the matching efficiency can be further improved and the processing burden of the terminal is reduced.

After the comparison result is acquired, the video clip matching result of the comment content is acquired based on the comparison result. In an implementation, the manner of acquiring the video clip matching result of the comment content based on a comparison result includes: in response to the comparison result indicating that the text information successfully matches tag information of the first candidate video clip, acquiring, based on the first candidate video clip, a target video clip matching the comment content, and taking a result that includes the target video clip as the video clip matching result.

In an implementation, the manner of acquiring the video clip matching result of the comment content based on a comparison result includes: taking a result that does not include any video clip as the video clip matching result in response to the comparison result indicating that the text information fails to match tag information of each candidate video clip. For example, the result that does not include any video clip includes or does not include the notification or prompt information, which is not limited in the embodiments of this disclosure.

By displaying the notification or prompt information, the user can be effectively notified or prompted that the comment content inputted by the user fails to match a video clip, so as to prevent the user from mistakenly considering that a function of playing the target video clip based on the comment content is invalid.

In an implementation, one or more first candidate video clips are included, which is not limited in the embodiments of this disclosure. In an implementation, when one or more first candidate video clips is included, the manner of acquiring, based on the first candidate video clip, a target video clip matching the comment content includes: taking the first candidate video clip as the target video clip matching the comment content.

In another implementation, when one or more first candidate video clips is included, the manner of acquiring, based on the first candidate video clip, a target video clip matching the comment content includes: determining a position of the first candidate video clip in a video from which the first candidate video clip comes, taking a center position of the position of the first candidate video clip in the video from which the first candidate video clip comes as a center, and editing the video clips of a first duration before and after the first candidate video clip, the edited video clips constituting the target video clip. The first duration is half of a designated duration. The designated duration is a duration that the target video clip is supposed to have, and can be set according to experience or flexibly adjusted according to an application scene. For example, the designated duration is 60 seconds. The process of acquiring a target video clip based on the first candidate video clip can also be implemented according to other manners, which is not illustrated in detail in the embodiments of this disclosure.

In an implementation, when a plurality of first candidate video clips are included, the manner of acquiring, based on the first candidate video clip, a target video clip matching the comment content includes: selecting one candidate video clip from the plurality of first candidate video clips as a target candidate video clip, and acquiring, based on the target candidate video clip, the target video clip matching the comment content. The manner of selecting one candidate video clip from a plurality of first candidate video clips as a target candidate video clip is not limited in the embodiments of this disclosure. For example, one candidate video clip is randomly selected from a plurality of first candidate video clips as a target candidate video clip. For example, the candidate video clip of which tag information and text information have the highest similarity among a plurality of first candidate video clips is taken as a target candidate video clip. After the target candidate video clip is determined, the target video clip matching the comment content is acquired based on the target candidate video clip. For an exemplary manner of acquiring, based on the target candidate video clip, the target video clip matching the comment content, see the manner of acquiring, based on the first candidate video clip, a target video clip matching the comment content when one first candidate video clip is included.

The target video clip which is played in combination with the comment content can be accurately determined based on the first candidate video clip obtained by matching, and the target video clip can be determined in a targeted manner based on the number of first candidate video clips, which can improve the determination accuracy of the target video clip and the matching degree of the target video clip and the comment content.

The process of locally acquiring, by the terminal, the video clip matching result of the comment content is illustrated above. For example, the terminal also acquires the video clip matching result of the comment content by interacting with the server. In an implementation, the manner of acquiring, by the terminal, the video clip matching result of the comment content by interacting with the server includes:

In a first manner, the terminal recognizes the text information corresponding to the comment content; the terminal transmits the text information to the server; the server compares the text information with the tag information of the candidate video clip, acquires the video clip matching result of the comment content based on a comparison result, and returns the video clip matching result; the terminal receives the video clip matching result returned by the server.

In the first manner, the operation of recognizing the text information corresponding to the comment content needs to be performed by the terminal, and the operation of acquiring the video clip matching result according to the text information is performed by the server. For an exemplary manner of acquiring, by the server, the video clip matching result according to the text information, see the related process of locally acquiring the video clip matching result by the terminal.

In a second manner, the terminal transmits the comment content to the server; the server recognizes the text information corresponding to the comment content, compares the text information with the tag information of the candidate video clip, acquires the video clip matching result of the comment content based on a comparison result, and returns the video clip matching result; the terminal receives the video clip matching result returned by the server.

In the second manner, the whole process of acquiring the video clip matching result according to the comment content is performed by the server. For an exemplary manner of acquiring, by the server, the video clip matching result according to the comment content, see the process of locally acquiring the video clip matching result by the terminal.

It can be understood from the contents introduced in step 202 that after the comment content in the video playback interface is acquired, the video clip matching result of the comment content in the video playback interface is acquired by the terminal. The video clip matching result may or may not include the target video clip matching the comment content.

In step 203, target comment information including a video clip playback control on the video playback interface are displayed in response to the video clip matching result including a target video clip matching the comment content, the video clip playback control being configured to trigger playback of the target video clip.

After the video clip matching result is acquired, it is determined whether the video clip matching result includes a target video clip matching the comment content. If the video clip matching result includes the target video clip matching the comment content, target comment information including a video clip playback control is displayed on the video playback interface. That is to say, in response to the video clip matching result including the target video clip matching the comment content, target comment information including a video clip playback control is displayed on the video playback interface.

In an implementation, after it is determined that the video clip matching result includes the target video clip matching the comment content, in response to the video clip matching result including the target video clip matching the comment content, the operation of displaying target comment information including a video clip playback control on the video playback interface is directly performed. In another implementation, when the comment information posting control is displayed on the video playback interface, in response to a trigger operation for the comment information posting control, and in response to the video clip matching result including the target video clip matching the comment content, the operation of displaying target comment information including a video clip playback control on the video playback interface is performed.

The comment information posting control is configured to trigger to post the comment information. During acquiring a trigger operation for the comment information posting control, it indicates that the target user wants to post the comment information. The trigger operation for the comment information posting control refers to a human-computer interaction operation triggered on the comment information posting control. The type of the trigger operation for the comment information posting control is not limited in the embodiments of this disclosure. For example, the trigger operation for the comment information posting control includes, but is not limited to, at least one of a single-click operation, a double-click operation, a floating touch operation, a pressure touch operation, or a sliding operation.

In this way, the notification or prompt information is displayed when the comment information posting control is triggered, so that the user can know the matching condition of a video clip before normally posting the comment content, and timely modify the comment content, which can effectively improve the quality of the comment content.

The video clip playback control is configured to trigger playback of the target video clip. That is to say, the target video clip can be played by triggering the video clip playback control included in the target comment information. The form of the video clip playback control is not limited in the embodiments of this disclosure, and can be set according to experience or flexibly adjusted according to an application scene.

Figure 5:
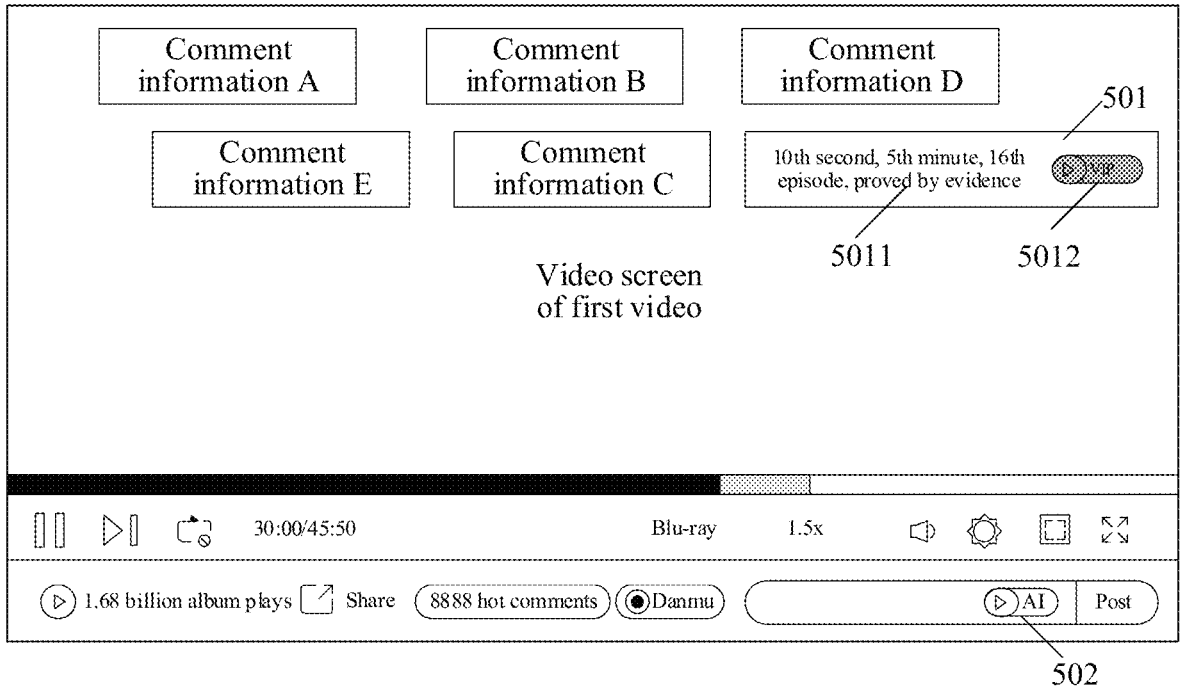
FIG. 5 is a schematic diagram of a video playback interface according to some embodiments of this disclosure.

In exemplary embodiments, in addition to the video clip playback control, the target comment information further includes the comment content. The comment content includes at least one of text and images. Based on the manner, the target comment information is comment information including the comment content and the video clip playback control, and can provide information of a plurality of dimensions such as text, images, and video clips, so that the target user and other users who are watching the first video can not only view the comment content in one piece of target comment information, but also watch the target video clip matching the comment content by triggering the video clip playback control, which improves the interactive experience of the users. For example, the target comment information displayed on the video playback interface is shown by 501 in FIG. 5. The target comment information 501 shown in FIG. 5 includes a comment content 5011 and a video clip playback control 5012.

In exemplary embodiments, the target comment information further includes associated information of the comment content. The associated information is information relevant to the comment content. For example, the associated information is at least one of an account number, a portrait, or a nickname of a user who edits the comment content.

In an implementation, the implementation of displaying target comment information including a video clip playback control on the video playback interface includes: controlling the target comment information including a video clip playback control to move from a reference position of the video playback interface into the video playback interface, so as to display the target comment information including the video clip playback control on the video playback interface. The reference position can be set according to experience or flexibly adjusted according to an application scene, which is not limited in the embodiments of this disclosure. For example, the reference position refers to a right side of the video playback interface. Alternatively, the reference position refers to a left side of the video playback interface. Alternatively, the reference position refers to an upper side of the video playback interface, etc.

For example, the manner of controlling target comment information to move from a reference position of the video playback interface into the video playback interface includes: controlling target comment information to move at a first reference speed from a reference position of the video playback interface into the video playback interface. The first reference speed can be set according to experience or flexibly adjusted according to an application scene, which is not limited in the embodiments of this disclosure. For example, the first reference speed is a relatively low speed so as to ensure that the target comment information can be smoothly moved into the video playback interface.

The implementation of displaying target comment information on the video playback interface is merely an exemplary example, and is not limited to this in the embodiments of this disclosure. For example, the target comment information is directly displayed on the video playback interface. Alternatively, the target comment information is displayed on the video playback interface by displaying a special effect.

In an implementation, after the displaying target comment information including a video clip playback control on the video playback interface, the following operation is further included: controlling the target comment information to move on the video playback interface. The manner of controlling the target comment information to move on the video playback interface is not limited in the embodiments of this disclosure. For example, the target comment information is controlled to move from right to left on the video playback interface at a second reference speed. The second reference speed can be set according to experience or flexibly adjusted according to an application scene, which is not limited in the embodiments of this disclosure.

In the process of controlling the target comment information to move on the video playback interface, in response to a selection operation for the target comment information, the target comment information is paused moving, and is displayed by a first display manner, the first display manner being different from a display manner of unselected comment information. For example, the selection operation for the target comment information refers to an operation of placing the mouse in a display region of the target comment information. For example, the selection operation for the target comment information refers to an operation of touching a display region of the target comment information with a finger.

The first display manner is not limited in the embodiments of this disclosure. For example, when a display background color of the unselected comment information is a first color, the first display manner is a display manner of adjusting the display background color into a second color. For example, the first color is white and the second color is gray. For example, target comment information displayed in a background color of gray is shown by 601 in FIG. 6.

In exemplary embodiments, when a display manner of the unselected comment information is not displaying an interactive control by default, the first display manner relates to displaying the interactive control in a surrounding region of the comment information. The interactive control includes, but is not limited to, an agreement control, a disagreement control, etc. The surrounding region may refer to a lower region, a right region, etc. In exemplary embodiments, the first display manner also relates to adjusting the background color and displaying the interactive control.

In exemplary embodiments, in response to a deselection operation for the target comment information, the target comment information is continued moving until the target comment information is moved out of the video playback interface.

In an implementation, after the displaying target comment information including a video clip playback control on the video playback interface, the following operation is further included: playing the target video clip on the video playback interface in response to a trigger operation for a video clip playback control. The video clip playback control is configured to trigger playback of the target video clip. Therefore, after the trigger operation for the video clip playback control is acquired, the target video clip is played on the video playback interface. For example, the process of playing the target video clip is the process of displaying a video screen of the target video clip in a region where the target video clip is played. The user can select playback of the target video clip through the video clip playback control. For example, the user selects to play or selects not to play the target video clip, which reduces the interference caused by direct playback of the target video clip in some cases where the user is watching the first video.

The region where the target video clip is played on the video playback interface is not limited in the embodiments of this disclosure. For example, the target video clip is played in an upper right region of the video playback interface. Alternatively, the target video clip is played in a nearby region of the target comment information displayed on the video playback interface. For example, as shown in FIG. 6, the target video clip is played in a nearby region 602 of target comment information 601.

Figure 6:
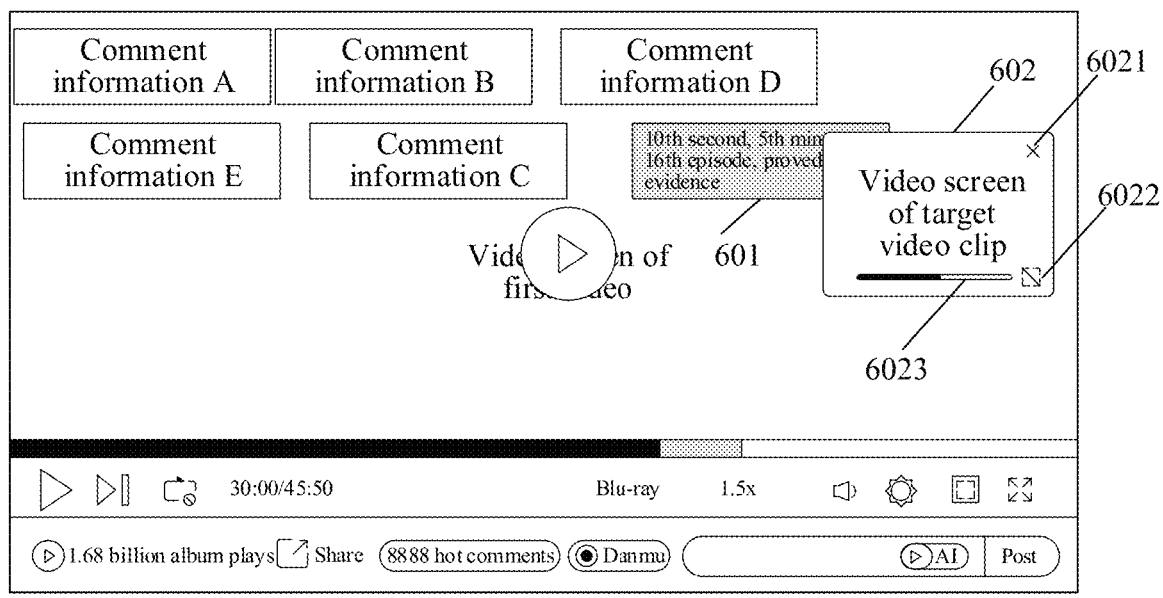
FIG. 6 is a schematic diagram of a video playback interface according to some embodiments of this disclosure.

For example, as shown in FIG. 6, in addition to the video screen of the target video clip, an off control 6021, a full screen playback control 6022, and a progress bar 6023 are further displayed in the region 602 where the target video clip is played. The off control 6021 is configured to cancel playback of the target video clip. The full screen playback control 6022 is configured to play the target video clip on the video playback interface in full screen mode. The progress bar 6023 is used for presenting the progress of playback of the target video clip.

In an implementation, the region where the target video clip is played supports at least one function of size adjustment and position change. For example, size adjustment of the region where the target video clip is played is realized by dragging one of four corners of the region where the target video clip is played. For example, size adjustment includes zooming and scaling. For example, position change of the region where the target video clip is played is realized by dragging the region where the target video clip is played. Size adjustment and position change can adapt to viewing demands and playback preferences of different users on the first video.

In an implementation, in the process of playing the target video clip on the video playback interface, the first video can be simultaneously played or paused playing, which is not limited in the embodiments of this disclosure. When the first video and the target video clip are simultaneously played, hybrid playback of an audio of the first video and an audio of the target video clip is allowed. Alternatively, the audio of the first video is played, but the audio of the target video clip is not played. Alternatively, the audio of the target video clip is played, but the audio of the first video is not played.

The first video is paused playing while playing the target video clip, which can prevent the information provided by the target video clip from being missed, or prevent the information of the first video from being missed while playing the target video clip.

The first video is paused playing while playing the target video clip on the video playback interface, which is taken as an example in the embodiments of this disclosure. For example, the video playback interface where the target video clip is played is as shown in FIG. 6. The first video is paused playing on the video playback interface shown in FIG. 6.

Figure 7:
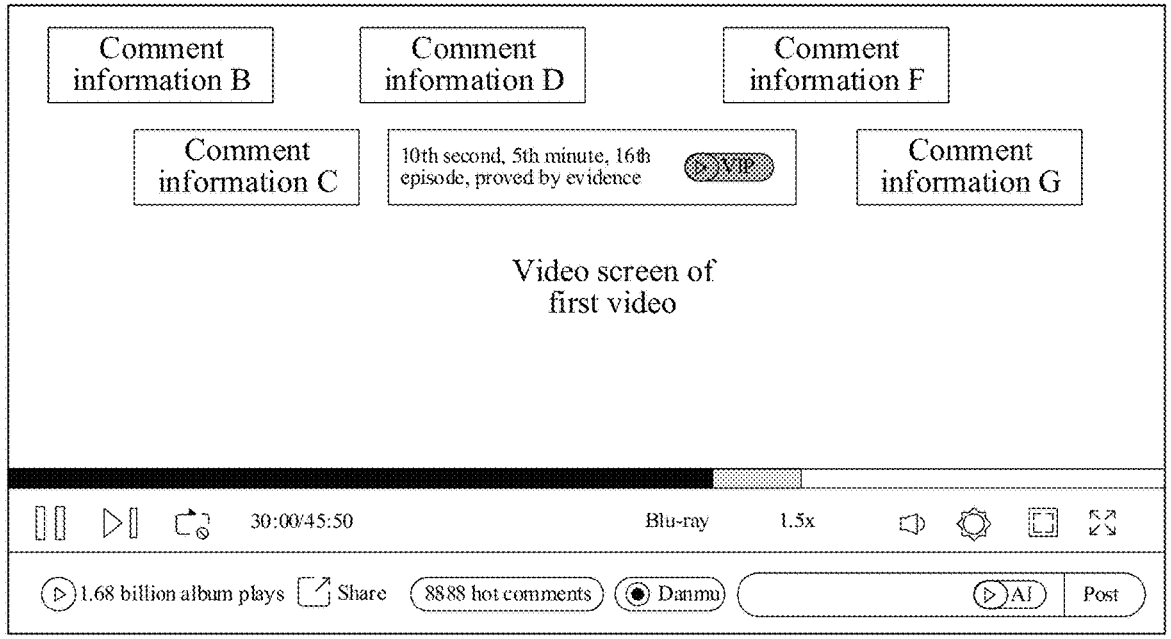
FIG. 7 is a schematic diagram of a video playback interface according to some embodiments of this disclosure.

In exemplary embodiments, the pausing playing the first video while playing the target video clip on the video playback interface further includes: canceling playing the target video clip and resuming playing the first video in response to a playback resumption operation for the first video. If the playback resumption operation for the first video is acquired, it indicates that the target user does not need to watch the target video clip, but needs to continue watching the first video, which improves the smoothness of first video playback. In this case, playback of the target video clip is canceled, and playback of the first video is resumed. For example, the video playback interface after canceling playback of the target video clip and resuming playback of the first video is as shown in FIG. 7.

In an implementation, the manner of acquiring the playback resumption operation for the first video includes: acquiring a playback resumption operation for the first video in response to a trigger operation for a target region in the video playback interface, the target region being any region in the video playback interface other than a region where the target video clip is played. That is to say, if a trigger operation for any region in the video playback interface other than a region where the target video clip is played is detected, the playback resumption operation for the first video is acquired.

The user can be provided with the manner of conveniently continuing watching the first video by triggering the target region to generate the playback resumption operation.

In another implementation, the manner of acquiring a playback resumption operation for the first video includes: acquiring the playback resumption operation for the first video in response to a trigger operation for an off control in the region where the target video clip is played.

In an implementation, the video clip matching result may not include the target video clip matching the comment content. In this case, in response to the video clip matching result not including the target video clip matching the comment content, notification or prompt information is displayed on the video playback interface, and is used for notifying or prompting that the comment content fails to match the video clip. For example, the notification or prompt information is included in the video clip matching result, and is acquired while acquiring the video clip matching result. For example, the notification or prompt information is locally generated at the terminal.

In exemplary embodiments, after it is determined that the video clip matching result does not include the target video clip matching the comment content, in response to the video clip matching result not including the target video clip matching the comment content, the operation of displaying notification or prompt information on the video playback interface is directly performed. In exemplary embodiments, when the comment information posting control is displayed on the video playback interface, in response to a trigger operation for the comment information posting control, and in response to the video clip matching result not including the target video clip matching the comment content, the operation of displaying notification or prompt information on the video playback interface is performed.

In this way, the utilization rate of system resources can be improved and the human-computer interaction efficiency can be improved by taking the video clip matching control and the comment information posting control as control modes of triggering to acquire the video clip matching result and display the target comment information.

For example, comment information including only the comment content is also displayed on the video playback interface while displaying the notification or prompt information.

Figure 8:
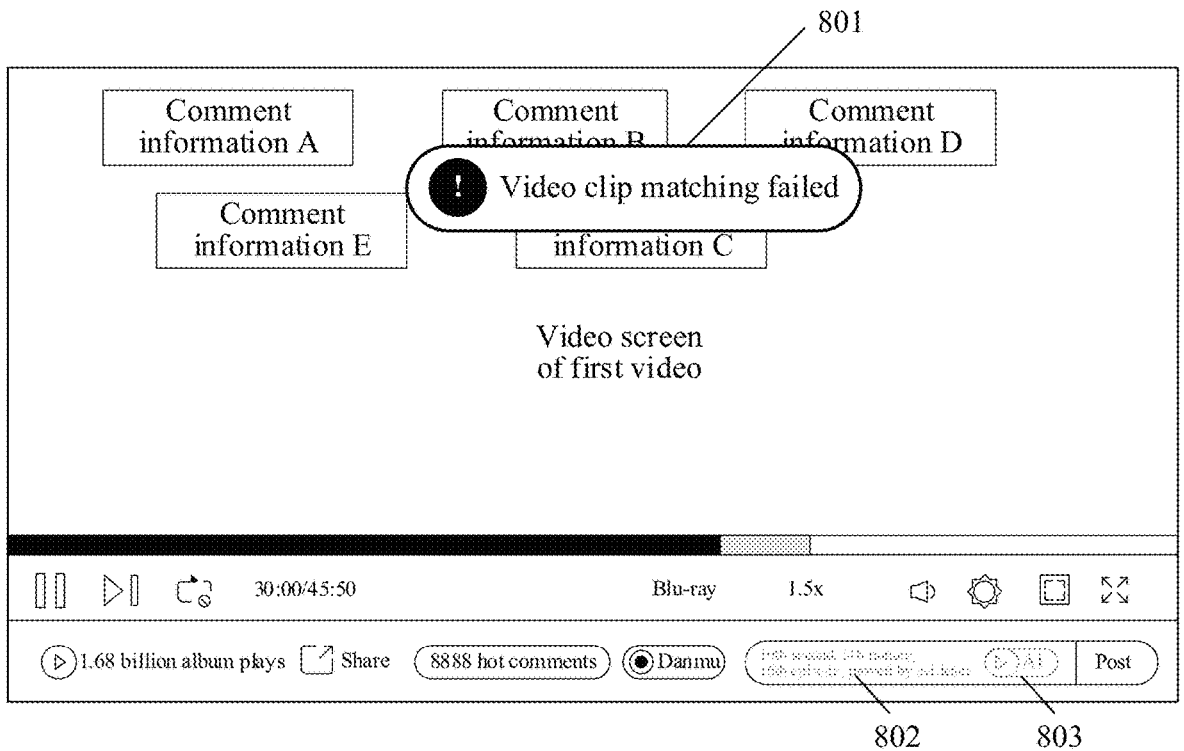
FIG. 8 is a schematic diagram of a video playback interface according to some embodiments of this disclosure.

For example, the video playback interface after displaying the notification or prompt information is as shown in FIG. 8. Notification or prompt information 801 of "video clip matching failed" is displayed in FIG. 8. In exemplary embodiments, when the notification or prompt information is displayed, the display colors of the comment content edited in the content editing box and the video clip matching control are adjusted to be light, as shown in 802 and 803 in FIG. 8. After display of the notification or prompt information is ended, the display colors of the comment content edited in the content editing box and the video clip matching control are restored to be normal. For example, a display duration of the notification or prompt information is set according to experience or flexibly adjusted according to an application scene. For example, the display duration of the notification or prompt information is two seconds.

In an implementation, after the changing a state of the video clip matching control from a disabled state to an enabled state in response to a trigger operation for the video clip matching control, the following operation is further included: restoring the state of the video clip matching control from the enabled state to the disabled state. Restoring the state of the video clip matching control to the disabled state can lay the foundation for the user to post comment information including the video clip playback control next time. For example, a video clip matching control restored to a disabled state is shown by 502 in FIG. 5. The time when the state of the video clip matching control is restored from the enabled state to the disabled state is not limited in the embodiments of this disclosure, and can be flexibly set according to an actual application scene.

In exemplary embodiments, when the comment information posting control is displayed on the video playback interface, after acquiring a trigger operation for the comment information posting control, the state of the video clip matching control is restored from the enabled state to the disabled state. That is to say, in response to the trigger operation for the comment information posting control, the state of the video clip matching control is restored from the enabled state to the disabled state. In this case, no matter whether the video clip matching result includes the target video clip matching the comment content, the operation of restoring the state of the video clip matching control from the enabled state to the disabled state is triggered according to the trigger operation for the comment information posting control.

In exemplary embodiments, if it is determined that the video clip matching result does not include the target video clip matching the comment content, the state of the video clip matching control is restored from the enabled state to the disabled state. That is to say, in response to the video clip matching result not including the target video clip matching the comment content, the state of the video clip matching control is restored from the enabled state to the disabled state.

In exemplary embodiments, if it is determined that the video clip matching result includes the target video clip matching the comment content, the video clip matching result is kept in the enabled state, and then is restored from the enabled state to the disabled state during acquiring a trigger operation for the comment information posting control.

In exemplary embodiments, in the operation of changing a state of the video clip matching control from a disabled state to an enabled state in response to a trigger operation for the video clip matching control, no matter whether the trigger operation for the comment information posting control is acquired and whether the video clip matching result includes the target video clip matching the comment content, the video clip matching result is kept in the enabled state until the trigger operation for the video clip matching control is acquired, and then the state of the video clip matching control is restored from the enabled state to the disabled state.

By setting the enabled state and the disabled state for the video clip matching control, the user can be intuitively notified or prompted whether a current comment content to be posted matches the target video clip so as to accurately select the manner of posting said comment content and avoid use of an incorrect manner, thereby improving the interaction efficiency.

In exemplary embodiments, in response to the trigger operation for the comment information posting control, the comment content in the video playback interface is cleared, which can make it convenient for the user to post the comment content next time.

The terminal which posts the target comment information is illustrated as an example in the embodiments of this disclosure. After the terminal which posts the target comment information successfully posts the target comment information, the server delivers the target comment information to other terminals which are used for watching the first video, so that other terminals display the target comment information on the video playback interface when playing at the posting moment of the target comment information. The process of displaying the target comment information and the operation after displaying the target comment information by other terminals may be similar or identical to those of the terminal which posts the target comment information.

Figure 9:
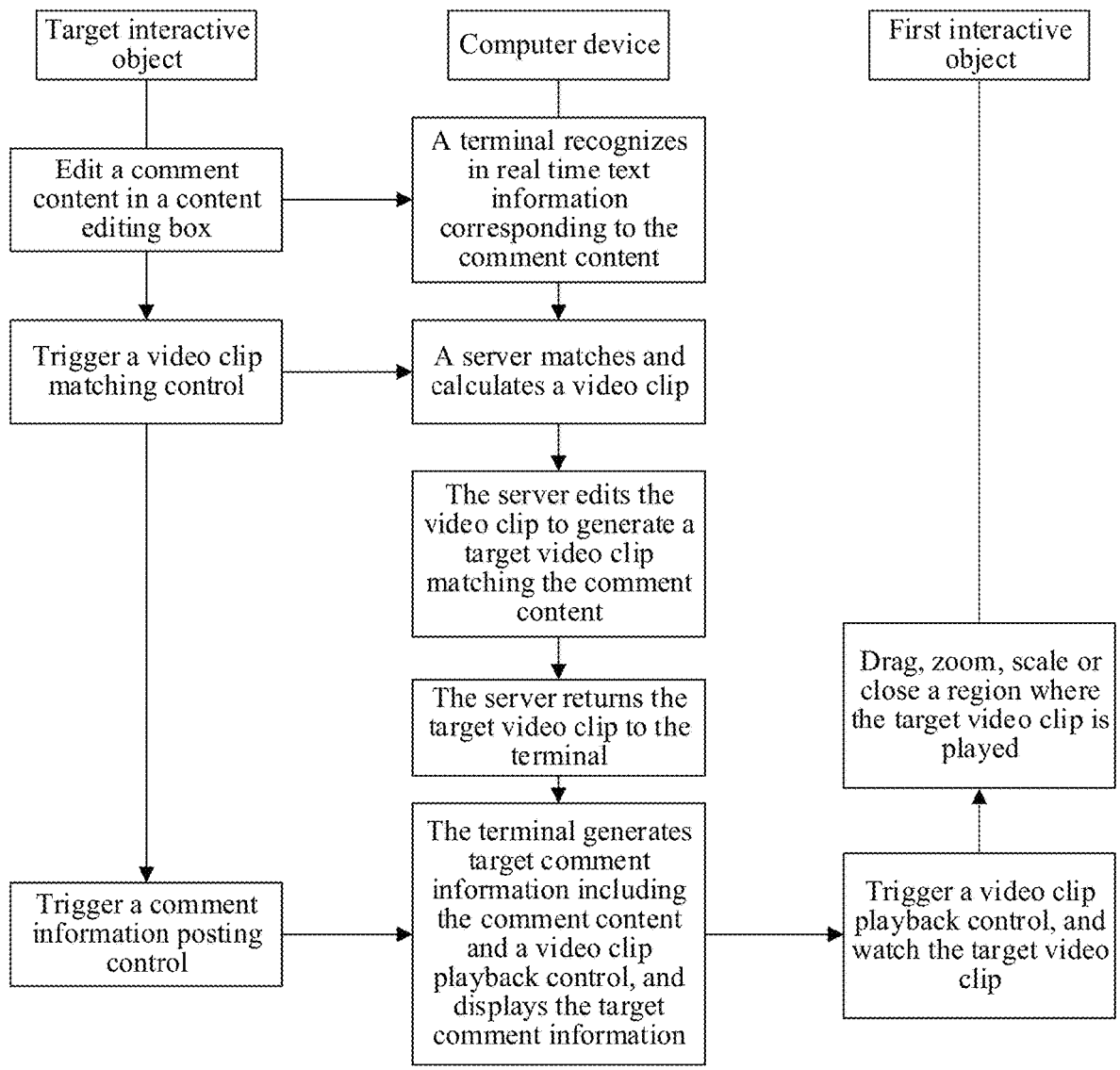
FIG. 9 is a schematic diagram of a comment information display process according to some embodiments of this disclosure.

In exemplary embodiments, the display process of the comment information is as shown in FIG. 9. The target user edits the comment content in the content editing box. The terminal recognizes in real time the text information corresponding to the comment content. The target user triggers the video clip matching control. The terminal transmits the text information to the server. The server matches and calculates a video clip, and edits the same to generate the target video clip matching the comment content. The server returns the target video clip to the terminal. The target user triggers the comment information posting control. The terminal generates the target comment information including the comment information and the video clip playback control, and displays the target comment information on the video playback interface. A first user (which may be the target user or other users) triggers the video clip playback control in the target comment information to watch the target video clip. The first user can drag, zoom, scale or close the region where the target video clip is played while watching the target video clip.

The embodiments of this disclosure provide a target comment information display manner which can provide information of a dimension of the video clip. The target video clip that can be played based on the target comment information is obtained by recognizing the comment content edited by the user (for example, some users who like spoilers directly spoil the results or add comment contents such as behind-the-scenes in the early intense or tragic pilot stage when watching the video multiple times), and quickly matching and editing the video clip. The target comment information including the video clip playback control used for triggering playback of the target video clip matching the comment content is generated in real time and displayed. The display manner of the comment information can expand the contents of the video spoiler type or funny behind-the-scenes and a special payment video, diversify the content forms of the comment information, and make users who like to watch spoilers or behind-the-scenes or even more details receive interpretations from perspectives of more dimensions in time while watching the video, which can improve the viewing experience of such users and increase the space for exploring the contents. At the same time, this can also make more commercial payment opportunities such as member-exclusive or even advanced on-demand. in some case, this may be suitable for users who like certain content, such as a mystery drama or a detective drama which is decoded, greatly improves the viewing experience of such users, and makes it stress-free for the users to watch the decoding process.

In addition, displaying the target comment information including the comment content and the video clip playback control can reduce video jump. A current interface allows to watch more video clips, and the video clip is strongly associated with the video which is currently being played, which can increase the duration that the user uses the application or the webpage, thereby increasing the commercial revenue.

According to the technical solutions provided in the embodiments of this disclosure, the comment information including the video clip playback control can be displayed on the video playback interface. The video clip playback control can trigger playback of the target video clip matching the comment content. That is to say, the comment information displayed in the embodiments of this disclosure can provide information of a dimension of the video clip, and expands a dimension of the information provided by the comment information. The user can trigger the video clip playback control in the comment information to watch the target video clip, which can improve the interactive experience of the user, thereby improving the human-computer interaction rate.

Figure 10:
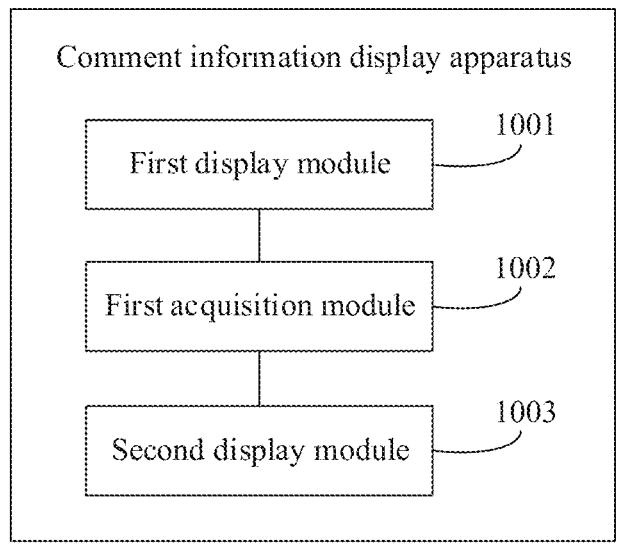
FIG. 10 is a schematic diagram of a comment information display apparatus according to some embodiments of this disclosure.

With reference to FIG. 10, the embodiments of this disclosure provide a comment information display apparatus. The apparatus may include a first display module 1001, a first acquisition module 1002, and a second display module 1003. One or more modules, submodules, and/or units of the apparatus can be implemented by processing circuitry, software, or a combination thereof, for example.

The first display module 1001 is configured to display a video playback interface.

The first acquisition module 1002 is configured to acquire a video clip matching result of a comment content in the video playback interface.

The second display module 1003 is configured to display target comment information including a video clip playback control on the video playback interface in response to the video clip matching result including a target video clip matching the comment content, the video clip playback control being configured to trigger playback of the target video clip.

In an implementation, a first video is played on the video playback interface. The first acquisition module 1002 is configured to recognize text information corresponding to the comment content; compare the text information with tag information of a candidate video clip, and acquire the video clip matching result of the comment content based on a comparison result, the candidate video clip being a video clip associated with the first video.

In an implementation, a first video is played on the video playback interface. The first acquisition module 1002 is configured to recognize text information corresponding to the comment content; transmit the text information to a server, the server being configured to compare the text information with tag information of a candidate video clip, acquire the video clip matching result of the comment content based on a comparison result, and return the video clip matching result, the candidate video clip being a video clip associated with the first video; and receive the video clip matching result returned by the server.

In an implementation, the first acquisition module 1002 is further configured to, in response to the comparison result indicating that the text information successfully matches tag information of a first candidate video clip, acquire, based on the first candidate video clip, a target video clip matching the comment content, and take a result that includes the target video clip as the video clip matching result.

In an implementation, the second display module 1003 is further configured to display notification or prompt information on the video playback interface in response to the video clip matching result not including the target video clip matching the comment content, the notification or prompt information being used for notifying or prompting that the comment content fails to match the video clip.

In an implementation, a comment information posting control is displayed on the video playback interface. The second display module 1003 is further configured to display the notification or prompt information on the video playback interface in response to a trigger operation for the comment information posting control.

Figure 11:
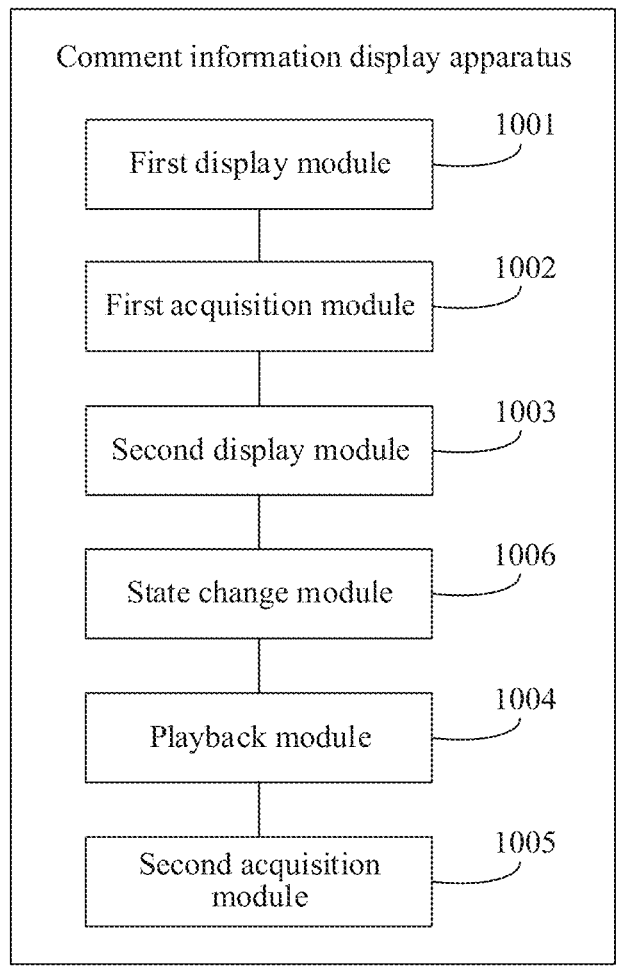
FIG. 11 is a schematic diagram of a comment information display apparatus according to some embodiments of this disclosure.

In an implementation, with reference to FIG. 11, the apparatus further includes a playback module 1004 that is configured to play the target video clip on the video playback interface in response to a trigger operation for the video clip playback control.

In an implementation, a first video is played on the video playback interface. The playback module 1004 is configured to play the target video clip on the video playback interface and pause playing the first video.

In an implementation, the playback module 1004 is further configured to cancel playing the target video clip and resume playing the first video in response to a playback resumption operation for the first video.

In an implementation, with reference to FIG. 11, the apparatus further includes a second acquisition module 1005 that is configured to acquire a playback resumption operation for the first video in response to a trigger operation for a target region in the video playback interface, the target region being any region in the video playback interface other than a region where the target video clip is played.

In an implementation, the region where the target video clip is played supports at least one function of size adjustment and position change.

In an implementation, a content editing box is displayed on the video playback interface, and the comment content is a content displayed in the content editing box.

In an implementation, a video clip matching control and the comment information posting control are displayed on the video playback interface. The first acquisition module 1002 is configured to acquire a video clip matching result of a comment content in the video playback interface in response to a trigger operation for the video clip matching control.

The second display module 1003 is configured to display target comment information including the video clip playback control on the video playback interface in response to a trigger operation for the comment information posting control.

In an implementation, with reference to FIG. 11, the apparatus further includes a state change module 1006 that is configured to change a state of the video clip matching control from a disabled state to an enabled state in response to a trigger operation for the video clip matching control.

In an implementation, the state change module 1006 is further configured to restore the state of the video clip matching control from the enabled state to the disabled state in response to a trigger operation for the comment information posting control.

In an implementation, the state change module 1006 is further configured to restore the state of the video clip matching control from the enabled state to the disabled state in response to the video clip matching result not including a target video clip matching the comment content.

In an implementation, the second display module 1003 is configured to control target comment information including a video clip playback control to move from a reference position of the video playback interface into the video playback interface, so as to display the target comment information including the video clip playback control on the video playback interface.

According to the technical solutions provided in the embodiments of this disclosure, comment information including the video clip playback control can be displayed on the video playback interface. The video clip playback control can trigger playback of the target video clip matching the comment content. That is to say, the comment information displayed in the embodiments of this disclosure can provide information of a dimension of the video clip, and expands a dimension of the information provided by the comment information. The user can trigger the video clip playback control in the comment information to watch the target video clip, which can improve the interactive experience of the user, thereby improving the human-computer interaction rate.

When the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus provided in the foregoing embodiments and the method embodiments may implement the same or similar concepts. For exemplary details of a specific implementation process, reference may be made to the method embodiments.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
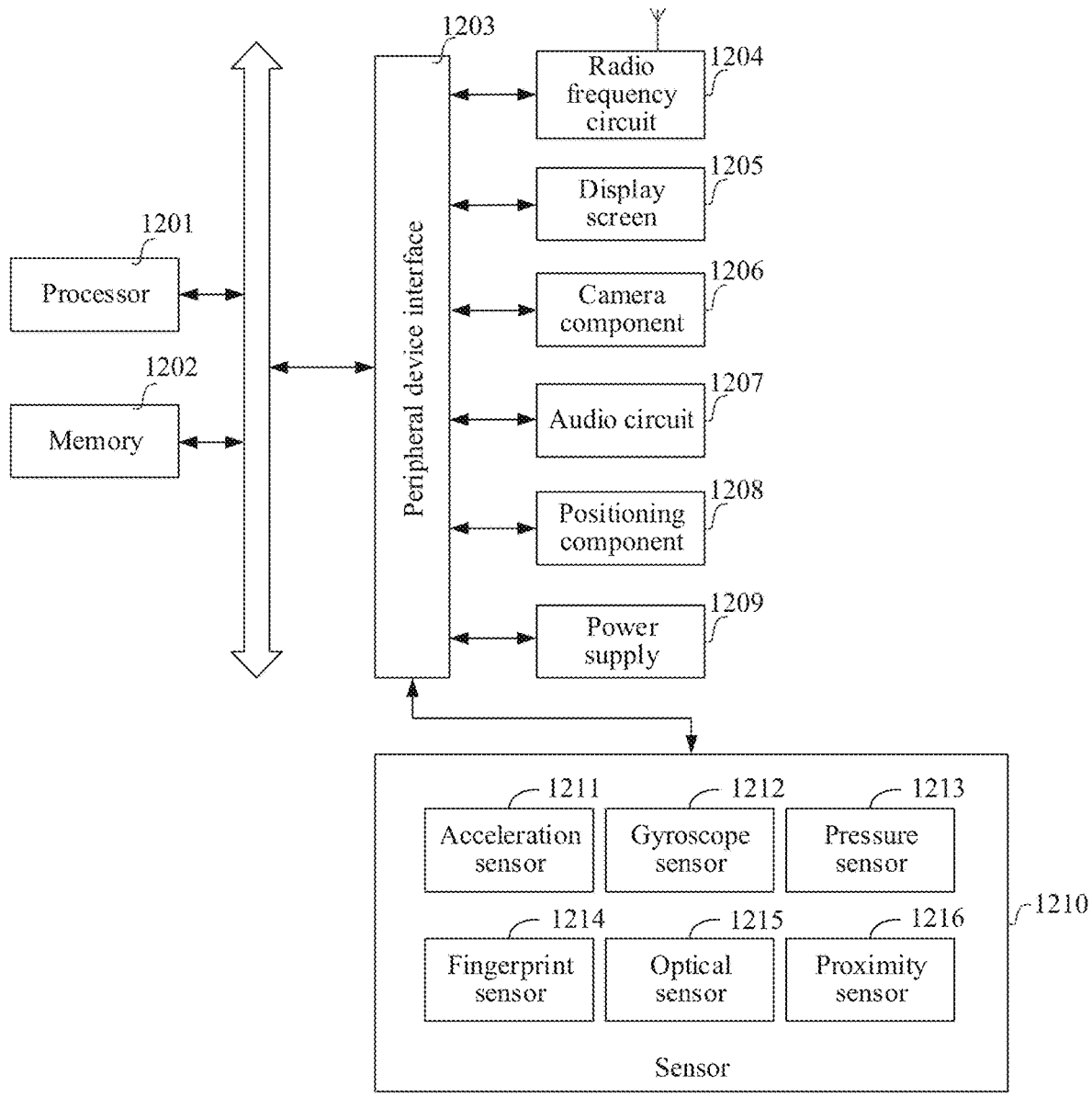
FIG. 12 is a schematic structural diagram of a terminal according to some embodiments of this disclosure.

FIG. 12 is a schematic structural diagram of a terminal according to embodiments of this disclosure. For example, the terminal is: a smartphone, a tablet computer, a moving picture experts group audio layer III (MP3) player, a moving picture experts group audio layer IV (MP4) player, a notebook computer, a desktop computer, or a vehicle-mounted terminal. The terminal is also referred to as other names such as user equipment, a portable terminal, a laptop terminal, or a desktop terminal.

The terminal may include a processor 1201 and a memory 1202.

Processing circuitry, such as the processor 1201, may include one or more processing cores, for example, a 4-core processor or an 8-core processor. The processor 1201 may be implemented in at least one hardware form among a digital signal processing (DSP), a field programmable gate array (FPGA), and a programmable logic array (PLA). The processor 1201 may also include a main processor and a coprocessor. The main processor is a processor configured to process data in a wake-up state, and is also referred to as a central processing unit (CPU). The coprocessor is a low-power consumption processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process computing operations related to machine learning.

The memory 1202 may include one or more computer-readable storage media. The computer-readable storage medium may be non-transitory. The memory 1202 may further include a high-speed random access memory and a nonvolatile memory, for example, one or more disk storage devices or flash storage devices. In some embodiments, the non-transitory computer-readable storage medium in the memory 1202 is configured to store at least one instruction, the at least one instruction being configured to be executed by the processor 1201 to cause the terminal to implement the comment information display method provided in any of the method embodiments of this disclosure.

In some embodiments, the terminal may further include: a peripheral device interface 1203 and at least one peripheral device. The processor 1201, the memory 1202, and the peripheral interface 1203 may be connected through a bus or a signal line. Each peripheral device may be connected to the peripheral device interface 1203 through a bus, a signal line, or a circuit board. For example, the peripheral device includes: at least one of a radio frequency (RF) circuit 1204, a display screen 1205, a camera component 1206, an audio circuit 1207, a positioning component 1208, or a power supply 1209.

The peripheral interface 1203 may be configured to connect the at least one peripheral device related to input/output (I/O) to the processor 1201 and the memory 1202.

The RF circuit 1204 is configured to receive and transmit an RF signal, which is also referred to as an electromagnetic signal. The RF circuit 1204 communicates with a communication network and other communication devices through the electromagnetic signal.

The display screen 1205 is configured to display a user interface (UI). The UI may include a graph, text, an icon, a video, and any combination thereof.

The camera component 1206 is configured to capture images or videos. In an example, the camera component 1206 includes a front-facing camera and a rear-facing camera.

The audio circuit 1207 may include a microphone and a loudspeaker.

The positioning component 1208 is configured to determine a current geographic location of the terminal to implement a navigation or a location-based service (LBS).

The power supply 1209 is configured to supply power to components in the terminal.

In some embodiments, the terminal further includes one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The structure shown in FIG. 12 does not constitute a limitation on the terminal, and the terminal may include more or fewer components than those shown in the figure, or some components may be combined, or a different component deployment may be used.

In exemplary embodiments, also provided is a computer device, including a processor and a memory, the memory having at least one computer program stored, and the at least one computer program being loaded and executed by the processor to cause the computer device to implement any of the comment information display methods.

In exemplary embodiments, also provided is a computer-readable storage medium, having at least one computer program stored thereon, and the at least one computer program being loaded and executed by a processor of a computer device to cause a computer to implement any of the comment information display methods.

In an implementation, the computer-readable storage medium may be a read-only memory (ROM), a random access memory (RAM), a compact disc ROM (CD-ROM), a magnetic tape, a floppy disk, an optical data storage device, or the like.

In exemplary embodiments, also provided is a computer program product, including a computer program or a computer instruction, the computer program or the computer instruction being loaded and executed by a processor to cause a computer to implement the comment information display method.

"A plurality of" mentioned herein means two or more. "And/or" describes an association relationship of associated objects and represents that there may be three relationships. For example, A and/or B may represent: only A, both A and B, and only B. The character "/" generally indicates an "or" relationship between the associated objects.

The foregoing descriptions are merely exemplary embodiments of this disclosure, and are not intended to limit this disclosure. Other embodiments shall fall within the scope of this disclosure.

What is claimed is:

1. A comment information display method, comprising:
    displaying a video and a comment interface, wherein the comment interface includes a content editing box, a video clip matching control element, and a comment information posting control element;
    receiving a comment content that is input via the content editing box;
    obtaining a video clip matching result based on the comment content in response to a trigger operation on the video clip matching control element;
    in response to a posting operation on the comment information posting control element, posting target comment information for the video including the comment content and an associated video clip playback control element configured to display the video clip matching result including a target video clip that matches the comment content; and
    playing back, by processing circuitry, the target video clip in response to a trigger operation on the associated video clip playback control element in a video playback interface.

2. The method according to claim 1, wherein the obtaining the video clip matching result comprises:
    determining text information corresponding to the comment content; and
    obtaining the video clip matching result based on a comparison of the text information with tag information of a candidate video clip of the video.

3. The method according to claim 2, wherein the obtaining the video clip matching result comprises:
    obtaining the video clip matching result based on a first candidate video clip of the video when the text information matches the tag information of the first candidate video clip.

4. The method according to claim 1, wherein the obtaining the video clip matching result comprises:
    determining text information corresponding to the comment content;
    sending the text information to a server, the server being configured to obtain the video clip matching result of the comment content based on a comparison of the text information with tag information of a candidate video clip of the video; and
    receiving the video clip matching result from the server.

5. The method according to claim 1, further comprising:
    displaying notification information based on the video clip matching result not including any video clip of the video that matches the comment content.

6. The method according to claim 5, wherein
    the displaying the notification information includes displaying the notification information based on the posting operation on the comment information posting control element.

7. The method according to claim 1, wherein the playing back the target video clip comprises:
playing back the target video clip and pausing the displaying of the video.

8. The method according to claim 7, further comprising:
stopping the play back of the target video clip and resuming the displaying of the video based on a resume playback operation for the video.

9. The method according to claim 8, further comprising:
receiving the resume playback operation for the video based on a user selection of a target region that is outside a region in which the target video clip is played.

10. The method according to claim 1, further comprising:
adjusting at least one of a size or a position of a region in which the target video clip is played back based on a user input.

11. The method according to claim 1, further comprising:
changing a state of the video clip matching control element from a disabled state to an enabled state based on a user selection of the video clip matching control element.

12. The method according to claim 11, further comprising:
changing the state of the video clip matching control element from the enabled state to the disabled state based on a user selection of the comment information posting control element.

13. The method according to claim 11, further comprising:
changing the state of the video clip matching control element from the enabled state to the disabled state based on the video clip matching result not including the target video clip matching the comment content.

14. A comment information display apparatus, comprising:
processing circuitry configured to:
display a video and a comment interface, wherein the comment interface includes a content editing box, a video clip matching control element, and a comment information posting control element;
receive a comment content that is input via the content editing box;
obtain a video clip matching result based on the comment content in response to a trigger operation on the video clip matching control element;
in response to a posting operation on the comment information posting control element, post target comment information for the video including the comment content and an associated video clip playback control element configured to display the video clip matching result including a target video clip that matches the comment content; and
play back the target video clip in response to a trigger operation on the associated video clip playback control element in a video playback interface.

15. The comment information display apparatus according to claim 14, wherein the processing circuitry configured to:
determining text information corresponding to the comment content; and
obtaining the video clip matching result based on a comparison of the text information with tag information of a candidate video clip of the video.

16. The comment information display apparatus according to claim 14, wherein the processing circuitry is configured to:
determine text information corresponding to the comment content;
send the text information to a server, the server being configured to obtain the video clip matching result of the comment content based on a comparison of the text information with tag information of a candidate video clip of the video; and
receive the video clip matching result from the server.

17. A non-transitory computer-readable storage medium, storing instructions which when executed by a processor cause the processor to perform:
displaying a video and a comment interface, wherein the comment interface includes a content editing box, a video clip matching control element, and a comment information posting control element;
receiving a comment content that is input via the content editing box;
obtaining a video clip matching result based on the comment content in response to a trigger operation on the video clip matching control element;
in response to a posting operation on the comment information posting control element, posting target comment information for the video including the comment content and an associated video clip playback control element configured to display the video clip matching result including a target video clip that matches the comment content; and
playing back the target video clip in response to a trigger operation on the associated video clip playback control element in a video playback interface.

* * * * *